(12) United States Patent
Nallathambi et al.

(10) Patent No.: US 12,572,878 B1
(45) Date of Patent: Mar. 10, 2026

(54) SYSTEMS AND METHODS FOR DYNAMIC ORGANIZATIONAL HIERARCHY VISUALIZATION AND ATTESTATION

(71) Applicant: THE BANK OF NEW YORK MELLON, New York, NY (US)

(72) Inventors: Pradeep Nallathambi, New York, NY (US); Ponraj Thangaraj, New York, NY (US); Melanie McCoy, New York, NY (US); Mehmet Ozlu, New York, NY (US); Amit Chowdhary, New York, NY (US)

(73) Assignee: THE BANK OF NEW YORK MELLON, New York, NY (US)

( * ) Notice: Subject to any disclaimer, the term of this patent is extended or adjusted under 35 U.S.C. 154(b) by 0 days.

(21) Appl. No.: 19/223,656

(22) Filed: May 30, 2025

(51) Int. Cl.
| | |
|---|---|
| *G06Q 10/10* | (2023.01) |
| *G06F 3/04817* | (2022.01) |
| *G06Q 10/06* | (2023.01) |
| *G06Q 10/067* | (2023.01) |
| *G06Q 30/02* | (2023.01) |
| *G06Q 30/06* | (2023.01) |

(52) U.S. Cl.
CPC ....... *G06Q 10/067* (2013.01); *G06F 3/04817* (2013.01)

(58) Field of Classification Search
CPC .......................... G06Q 10/067; G06F 3/04817
USPC .................................................. 705/1.1, 348
See application file for complete search history.

(56) References Cited

U.S. PATENT DOCUMENTS

| | | | | |
|---|---|---|---|---|
| 8,386,300 B2 * | 2/2013 | April | ...................... | G06Q 10/06 |
| | | | | 705/7.36 |
| 8,392,661 B1 | 3/2013 | Metcalf | | |

(Continued)

OTHER PUBLICATIONS

Willem de Bruijn et al., "Application-Tailored I/O with Streamline", ACM Transactions on Computer Systems, vol. 2, Article 6, Publication Date: May 2011, pp. 6:1-6:33.

(Continued)

*Primary Examiner* — Jonathan P Ouellette
(74) *Attorney, Agent, or Firm* — Pillsbury Winthrop Shaw Pittman, LLP

(57) ABSTRACT

Systems and methods are provided for constructing and managing a dynamic organizational hierarchy. A processor retrieves structured organizational data and generates a hierarchical data structure representing employees, teams, and reporting relationships. The hierarchy is rendered in an interactive graphical user interface that supports real-time updates, filtering, and structural management. Compliance rules are applied to validate assignments, identify violations, and flag nodes requiring review. Visual indicators are associated with nodes corresponding to rule exceptions or pending attestations. Users may interact with the hierarchy to review, confirm, or modify assignments, and changes may be simulated within a sandbox environment prior to finalization. Attestation workflows enable authorized stakeholders to confirm proposed changes before incorporation into live data. The system supports multi-parameter querying, structural visualization, and governance enforcement in real time, improving accuracy, accountability, and allocation agility compared to static or manual systems.

20 Claims, 4 Drawing Sheets

(56)                References Cited

U.S. PATENT DOCUMENTS

| | | | |
|---|---|---|---|
| 8,631,021 B2 * | 1/2014 | Palmer | G06F 7/00 |
| | | | 707/754 |
| 9,804,747 B2 * | 10/2017 | Schmitlin | G06F 21/6218 |
| 10,068,189 B2 * | 9/2018 | Couper | G06Q 10/06 |
| 2007/0143336 A1 * | 6/2007 | Lindley | G06Q 10/067 |
| | | | 707/999.102 |
| 2007/0226027 A1 | 9/2007 | Chang | |
| 2010/0100561 A1 | 4/2010 | Cooper | |
| 2011/0307413 A1 * | 12/2011 | Dutta | G06Q 10/105 |
| | | | 705/348 |
| 2012/0036463 A1 * | 2/2012 | Krakovsky | G06Q 10/06 |
| | | | 715/771 |
| 2013/0002676 A1 * | 1/2013 | Ziemann | G06T 11/20 |
| | | | 345/440 |
| 2014/0279628 A1 * | 9/2014 | Straznitskas | G06Q 10/105 |
| | | | 705/320 |
| 2015/0135043 A1 * | 5/2015 | Apps | G06Q 50/01 |
| | | | 715/202 |
| 2016/0217424 A1 * | 7/2016 | Challenger | G06Q 10/067 |
| 2017/0206292 A1 | 7/2017 | Bennett | |
| 2019/0034339 A1 | 1/2019 | Mesnier | |
| 2019/0130012 A1 * | 5/2019 | Franke | G06F 16/2453 |
| 2025/0217392 A1 * | 7/2025 | Young | G06F 9/547 |

OTHER PUBLICATIONS

Google Search and definition cache node (Year: 2025)—7 pgs.

\* cited by examiner

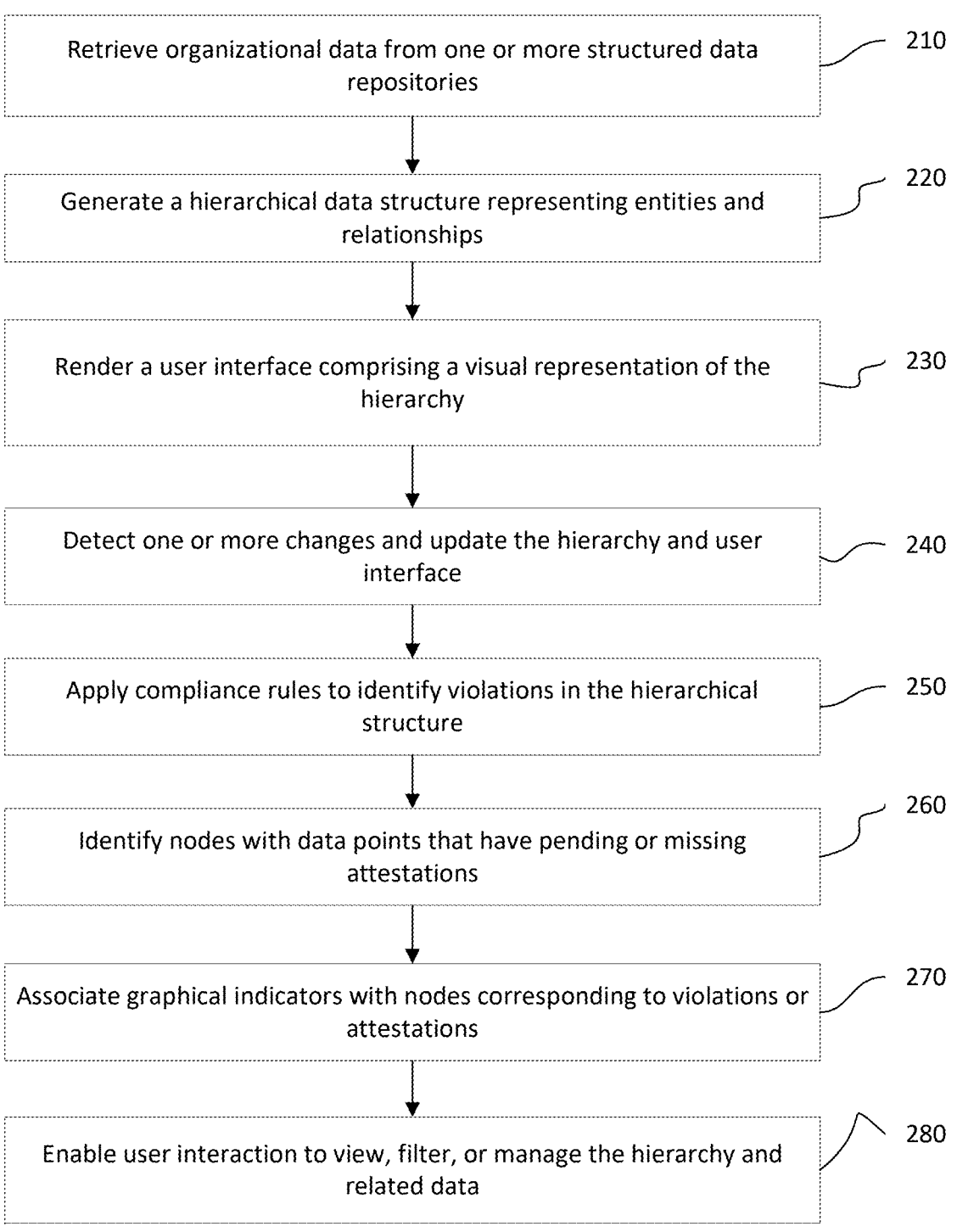

Retrieve organizational data from one or more structured data repositories — 210

Generate a hierarchical data structure representing entities and relationships — 220

Render a user interface comprising a visual representation of the hierarchy — 230

Detect one or more changes and update the hierarchy and user interface — 240

Apply compliance rules to identify violations in the hierarchical structure — 250

Identify nodes with data points that have pending or missing attestations — 260

Associate graphical indicators with nodes corresponding to violations or attestations — 270

Enable user interaction to view, filter, or manage the hierarchy and related data — 280

SYSTEMS AND METHODS FOR DYNAMIC ORGANIZATIONAL HIERARCHY VISUALIZATION AND ATTESTATION

FIELD OF THE INVENTION

The present disclosure relates generally to data visualization and validation systems. More specifically, it pertains to systems and methods for generating, updating, and managing interactive organizational charts in real-time, along with integrated rule-based validation and attestation workflows.

BACKGROUND

In modern enterprise environments, the ability to understand and manage organizational structure is foundational to resource allocation, compliance, and operational agility. Organizational hierarchy charts traditionally serve to illustrate employee reporting relationships, team structures, and role distributions across business units. Despite their strategic importance, most existing tools for managing organizational hierarchies suffer from serious technical limitations, rendering them inadequate for dynamic, policy-driven environments.

Conventional organizational charts are often static in design-constructed manually in spreadsheet tools or presentation software and stored as standalone documents. These representations do not update automatically, are decoupled from human resources information systems (HRIS), and quickly fall out of sync with the actual structure of the organization. As a result, they become obsolete almost as soon as they are created, creating friction for managers, HR teams, and compliance officers who depend on accurate information for decision-making.

Even where organizations attempt to automate portions of this process using workforce management systems or HR platforms, the technical architectures of those systems are often batch-oriented and monolithic. They rely on scheduled data refreshes, require manual intervention for structural edits, and lack event-driven mechanisms for real-time propagation of changes. For example, when an employee is reassigned to a new team or manager, existing platforms typically require manual re-entry of data across multiple interfaces, and provide no guarantee that visualizations or compliance checks will be updated accordingly.

Furthermore, current platforms are typically devoid of intelligent, system-enforced rule engines. Instead of proactively validating team configurations, reporting chains, or platform alignment against organizational policies, most tools expect end-users to perform these validations manually. In practice, these rules are often encoded in training materials, static checklists, or embedded in offline spreadsheets. This ad hoc approach not only leads to frequent violations of structural guardrails, but also hinders traceability and audit readiness.

Another shortcoming of existing tools is their inability to manage attestation workflows-structured processes in which organizational stakeholders (e.g., practice leads, platform owners, or HR business partners) formally verify and approve structural changes or assignments. Where attestation does occur, it is often managed outside the system via disconnected processes such as email approvals, undocumented verbal confirmation, or offline reviews. This creates significant governance gaps, particularly in regulated industries or organizations undergoing frequent organizational change.

From a user experience perspective, legacy systems are rigid and limited. They often present data in hardcoded layouts without the ability to search, filter, or visualize the hierarchy in multiple formats. They fail to support dynamic interaction—for example, allowing a platform manager to isolate all employees in a pod missing manager assignments, or letting an HR partner quickly locate unconfirmed roles across their portfolio. The lack of flexible filtering, interactive exploration, and contextual insight severely constrains the system's utility.

Additionally, current systems are ill-equipped to support sandbox environments, where proposed changes to the hierarchy can be previewed, validated, and attested to before being applied to production data. In the absence of such environments, organizations are forced to make tentative changes in live systems-creating risks of data corruption, inconsistent reporting, and downstream integration failures.

Security and compliance are also concerns. Without centralized tracking of who approved what change, when, and under what context, organizations are left with audit gaps that can undermine their compliance with internal controls, external regulations, or industry standards.

These technical limitations collectively result in systems that are inflexible, error-prone, manually intensive, and incapable of supporting the real-time, rule-driven, and auditable needs of modern resource allocation. There is therefore a pressing need for a system that combines dynamic data visualization with intelligent rule enforcement and secure attestation workflows-all backed by scalable, responsive architecture.

SUMMARY

In some aspects, the techniques described herein relate to a method for constructing and updating a dynamic organizational hierarchy visualization, including: retrieving, by a processor, organizational data from one or more structured data repositories, the organizational data including one or more of employee identifiers, reporting relationships, role designations, team affiliations, platform assignments, or attestation statuses; generating, by the processor, a hierarchical data structure representing organizational entities as nodes and reporting relationships as edges, based on the organizational data; rendering, by the processor, a user interface including a visual representation of the hierarchical data structure; detecting, by the processor, one or more changes in the organizational data, and updating the hierarchical data structure and visual representation in response to the one or more changes; applying, by the processor, a set of compliance rules to the hierarchical data structure to identify rule violations; identifying, by the processor, one or more nodes associated with data points that have pending or missing attestations; associating, by the processor, one or more graphical indicators with nodes corresponding to rule violations or pending attestations; and enabling, by the processor, user interaction with the user interface to at least one of view, filter, or manage the organizational hierarchy and related data.

In some aspects, the techniques described herein relate to a method, further including determining, by the processor, expected roles for one or more employees based on one or more predefined organizational models.

In some aspects, the techniques described herein relate to a method, further including determining, by the processor, reporting line managers for one or more employees based on the employees' assigned roles and existing reporting hierarchies.

In some aspects, the techniques described herein relate to a method, wherein enabling user interaction includes receiving a search query including multiple organizational attributes, and filtering the visual representation to display a subset of nodes matching the search query.

In some aspects, the techniques described herein relate to a method, wherein the graphical indicators include visual elements selected from icons, highlights, or tooltips displayed proximate to the affected nodes.

In some aspects, the techniques described herein relate to a method, further including applying, by the processor, compliance rules at at least one of an individual employee level or an aggregated platform level.

In some aspects, the techniques described herein relate to a method, further including generating, by the processor, a summary of headcount and compensation data grouped by business unit or resource type, and displaying the summary in association with the visual representation.

In some aspects, the techniques described herein relate to a method, further including enabling, by the processor, a simulation environment in which changes to the organizational data may be applied and visualized without altering the structured data repositories, and further including receiving user input attesting to or accepting one or more simulated changes for incorporation into the data repositories.

In some aspects, the techniques described herein relate to a system for constructing and updating a dynamic organizational hierarchy visualization, including: at least one processor; and one or more storage devices storing one or more code sets that, when executed by the at least one processor, cause the processor to: retrieve organizational data from one or more structured data repositories, the organizational data including one or more of employee identifiers, reporting relationships, role designations, team affiliations, platform assignments, or attestation statuses, via a data ingestion module; generate a hierarchical data structure representing organizational entities as nodes and reporting relationships as edges, based on the organizational data, via a hierarchy construction module; render a user interface including a visual representation of the hierarchical data structure, via a graphical rendering module; detect one or more changes in the organizational data and update the hierarchical data structure and visual representation in response to the one or more changes, via a synchronization module; apply a set of compliance rules to the hierarchical data structure to identify rule violations, via a rule evaluation module; identify one or more nodes associated with data points that have pending or missing attestations, via an attestation tracking module; associate one or more graphical indicators with nodes corresponding to rule violations or pending attestations, via the graphical rendering module; and enable user interaction with the user interface to at least one of view, filter, or manage the organizational hierarchy and related data, via the graphical rendering module.

In some aspects, the techniques described herein relate to a system, further configured to determine expected roles for one or more employees based on one or more predefined organizational models.

In some aspects, the techniques described herein relate to a system, further configured to determine reporting line managers for one or more employees based on the employees' assigned roles and existing reporting hierarchies.

In some aspects, the techniques described herein relate to a system, wherein enabling user interaction includes receiving a search query including multiple organizational attributes, and filtering the visual representation to display a subset of nodes matching the search query.

In some aspects, the techniques described herein relate to a system, wherein the graphical indicators include visual elements selected from icons, highlights, or tooltips displayed proximate to the affected nodes.

In some aspects, the techniques described herein relate to a system, further including applying, by the processor, compliance rules at at least one of an individual employee level or an aggregated platform level.

In some aspects, the techniques described herein relate to a system, further configured to generate a summary of headcount and compensation data grouped by business unit or resource type, and displaying the summary in association with the visual representation.

In some aspects, the techniques described herein relate to a system, further configured to enable a simulation environment in which changes to the organizational data may be applied and visualized without altering the structured data repositories, and further including receiving user input attesting to or accepting one or more simulated changes for incorporation into the data repositories.

In some aspects, the techniques described herein relate to a non-transitory computer-readable medium storing instructions that, when executed by one or more processors, cause the one or more processors to: retrieve organizational data from one or more structured data repositories, the organizational data including one or more of employee identifiers, reporting relationships, role designations, team affiliations, platform assignments, or attestation statuses; generate a hierarchical data structure representing organizational entities as nodes and reporting relationships as edges, based on the organizational data; render a user interface including a visual representation of the hierarchical data structure; detect one or more changes in the organizational data and update the hierarchical data structure and visual representation in response to the one or more changes; apply a set of compliance rules to the hierarchical data structure to identify rule violations; identify one or more nodes associated with data points that have pending or missing attestations; associate one or more graphical indicators with nodes corresponding to rule violations or pending attestations; and enable user interaction with the user interface to at least one of view, filter, or manage the organizational hierarchy and related data.

In some aspects, the techniques described herein relate to a non-transitory computer-readable medium, wherein the graphical indicators include visual elements selected from icons, highlights, or tooltips displayed proximate to the affected nodes.

In some aspects, the techniques described herein relate to a non-transitory computer-readable medium, further configured to apply compliance rules at at least one of an individual employee level or an aggregated platform level.

In some aspects, the techniques described herein relate to a non-transitory computer-readable medium, further configured to enable a simulation environment in which changes to the organizational data may be applied and visualized without altering the structured data repositories, and further including receiving user input attesting to or accepting one or more simulated changes for incorporation into the data repositories.

Various other aspects, features, and advantages will be apparent through the detailed description and the drawings attached hereto. It is also to be understood that both the foregoing general description and the following detailed description are exemplary and not restrictive of the scope of the disclosure.

BRIEF DESCRIPTION OF THE FIGURES

FIG. 2 depicts an example method for a dynamic organizational hierarchy visualization and attestation, in accordance with at least one embodiment;

Figure 1:
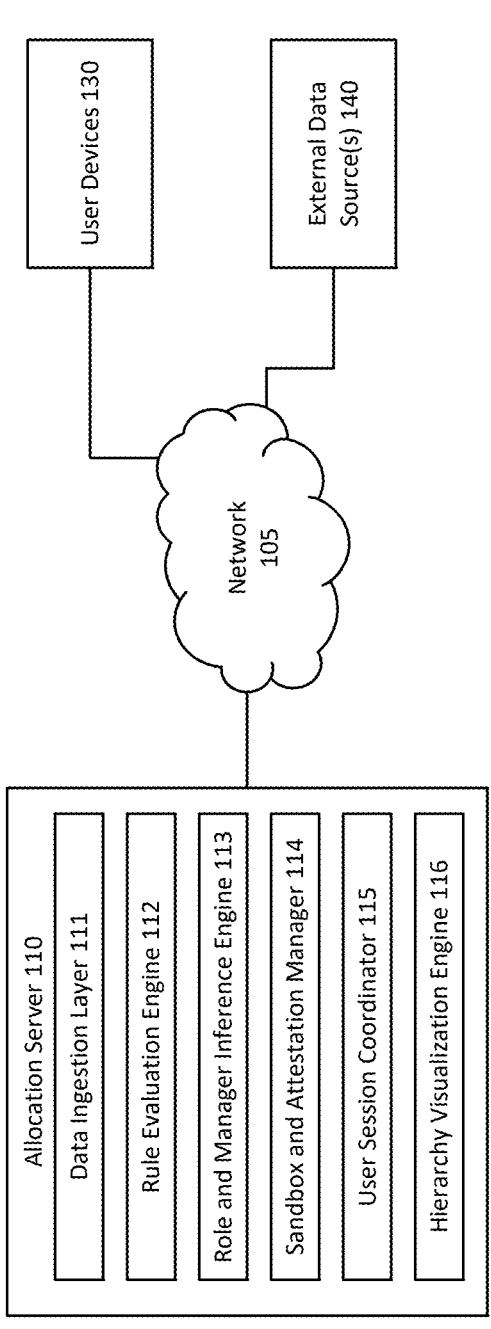
FIG. 1 illustrates an exemplary for a dynamic organizational hierarchy visualization and attestation platform, in accordance with at least one embodiment.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION

In the following description, for the purposes of explanation, numerous specific details are set forth in order to provide a thorough understanding of the various embodiments. It will be appreciated, however, by those having skill in the art, that the embodiments may be practiced without these specific details, or with an equivalent arrangement. In other cases, well-known structures and devices are shown in block diagram form in order to avoid unnecessarily obscuring the embodiments.

The present disclosure describes systems and methods for constructing and managing a dynamic visualization of an organizational hierarchy. In contrast to traditional organizational charts that rely on static, manually updated diagrams, the disclosed system provides a dynamic, interactive, and policy-aware platform that continuously reflects the current structure of the enterprise. The system supports live data integration, real-time validation against organizational rules, and structured attestation of roles, reporting relationships, and platform affiliations.

In various embodiments, the system retrieves structured organizational data from one or more repositories. This data may include employee identifiers, role designations, reporting lines, team and platform assignments, and attestation statuses. The system processes this data to construct a hierarchical data model in which each node represents an organizational entity, such as an employee or team, and each edge represents a defined reporting or structural relationship. The model may incorporate multiple hierarchy types, including practice-based, platform-based, and reporting-line-based structures.

As used herein, employee is intended to be interpreted broadly and may refer to any individual encompassed within the definition of personnel. This includes, without limitation, full-time or part-time workers, temporary staff, contractors, consultants, interns, volunteers, remote workers, management, executives, or any other individuals who contribute labor, services, or expertise to an organization, whether compensated or uncompensated, and regardless of formal employment status or contractual relationship. The term employee is therefore used herein as a functional designation rather than a legal classification, and may include any human participant involved in the operations, processes, or activities described.

Once generated, the hierarchy is rendered in a user interface that supports interactive exploration and live updates. The visual representation may present the structure in formats such as tree views or nested pods. When underlying data changes are detected—for example, when a new hire is added, an employee changes teams, or a reporting relationship is modified—the system updates the hierarchical model and refreshes the user interface automatically to reflect the new state of the organization. This dynamic update capability eliminates the need for manual reconfiguration and ensures that users are always interacting with a current and accurate view of the enterprise.

To enforce compliance with organizational policies, the system incorporates a rule evaluation engine that applies validation logic to the hierarchical model. Rules may be evaluated at multiple levels. At the individual employee level, the system may validate that each employee is correctly assigned to a team, that their manager relationship is consistent with job architecture and reporting policy, and that their role matches predefined expectations based on grade or function. At the platform or team level, the rule engine may validate structural guardrails such as minimum and maximum team sizes, required ratios of leadership to non-leadership roles, or appropriate geographic distribution of personnel within a given group.

When a rule violation is detected, the system creates an exception record and annotates the visual hierarchy with an associated graphical indicator. These indicators may appear as warning icons, color highlights, or other visual elements positioned near the affected node. Through this mechanism, the user interface serves not only as a visualization tool but also as a compliance console, enabling users to immediately identify and address structural misalignments.

The system also supports an integrated attestation workflow. Attestation refers to the process of confirming the validity of data within the hierarchy, such as confirming that a particular employee is assigned to the correct manager, role, or team. When a data point requires confirmation, the system identifies the responsible stakeholder—such as a platform manager or practice lead—and presents the relevant information in the interface for review. Upon confirmation, the system updates the attestation status, logs the approval action with appropriate metadata, and modifies the corresponding graphical indicator to reflect the attested state. This workflow enables traceable, policy-aligned review and reduces the need for offline or ad hoc verification methods.

To facilitate proactive allocation, the system further provides a simulation environment. In this environment, users may create and preview changes to the organizational structure without impacting the underlying source data. Simulated changes are subject to the same rule evaluations and attestation workflows as production data, allowing stakeholders to validate the potential impact of changes before finalizing them. Once validated and, if applicable, attested to, these simulated changes may be accepted into the live hierarchy, enabling safe and auditable transformation of the organization.

The system may also infer roles and reporting line managers using predefined job architecture mappings and existing organizational data. When a user selects a role for assignment, the system may determine the expected reporting structure based on department, grade, and practice alignment. If a reporting manager is not explicitly specified, the system may automatically identify the most appropriate candidate based on role eligibility, proximity in the reporting chain, and predefined rule logic. This feature reduces manual configuration errors and improves alignment with organizational policy.

To assist users in navigating large and complex hierarchies, the system supports advanced search and filtering functionality. A user may input multiple criteria, such as employee ID, requisition number, or platform designation, in a single search field. The system interprets and applies these inputs using a multi-parameter querying engine to isolate the relevant subset of the hierarchy. The filtered view may be used to examine a specific team, resolve exceptions, or complete targeted attestations.

In some embodiments, the system also supports the generation of analytical summaries. These summaries may include headcount totals, role distributions, or compensation groupings aggregated by platform, team, or business unit. The summaries are rendered in conjunction with the visual hierarchy and are updated in real time as changes are made to the underlying data. This feature allows planners and organizational leaders to assess the impact of structural decisions immediately and to make informed choices aligned with budgetary and strategic objectives.

The systems and methods described herein introduce a comprehensive platform for managing organizational hierarchies that is both structurally dynamic and policy-aware. By integrating live data ingestion, rule enforcement, attestation workflows, and interactive visualization into a single environment, the system significantly improves upon the technical capabilities of existing solutions. It enables greater transparency, reduces administrative overhead, supports compliance with structural guardrails, and empowers stakeholders to plan and validate organizational changes with confidence and precision.

These and other aspects of the systems and methods for providing evaluation requests will be further described in detail herein.

Those with skill in the art will appreciate that inventive concepts described herein may work with various system configurations. In addition, various embodiments of this disclosure may be made in hardware, firmware, software, or any suitable combination thereof. Aspects of this disclosure may also be implemented as instructions stored on a machine-readable medium, which may be read and executed by one or more processors. A machine-readable medium may include any mechanism for storing or transmitting information in a form readable by a machine (e.g., a computing device, or a signal transmission medium), and may include a machine-readable transmission medium or a machine-readable storage medium. For example, a machine-readable storage medium may include read only memory, random access memory, magnetic disk storage media, optical storage media, flash memory devices, and others. Further, firmware, software, routines, or instructions may be described herein in terms of specific exemplary embodiments that may perform certain actions. However, it will be apparent that such descriptions are merely for convenience and that such actions in fact result from computing devices, processors, controllers, or other devices executing the firmware, software, routines, or instructions. These and other features are described in detail herein with reference to the foregoing figures.

FIG. 1 illustrates an exemplary system architecture for a dynamic organizational hierarchy visualization and attestation platform, referred to generally as system 100. In various embodiments, system 100 may be implemented in a centralized, distributed, or cloud-native configuration and may include an Allocation Server 110, one or more User Devices 130, one or more Data Sources 140, and a communication network 105. Each of these components may be adapted to meet varying enterprise requirements, and the system may be deployed in a range of operational environments, including corporate data centers, private clouds, or public cloud infrastructure.

In various embodiments, network 105 may provide the communication fabric through which the elements of system 100 exchange data. Network 105 may include one or more public or private data networks and may support both local and distributed configurations. For example, network 105 may comprise a local area network (LAN), a wide area network (WAN), a metropolitan area network (MAN), a wireless network, a virtual private network (VPN), or any combination thereof. In cloud-based deployments, network 105 may include a data transfer fabric connecting services across different geographic regions, availability zones, or infrastructure segments.

Communications over network 105 may occur synchronously or asynchronously and may utilize transport protocols such as HTTPS, RESTful APIs, WebSockets, gRPC, or message queue-based middleware. In some embodiments, network 105 may support authentication protocols, encryption standards, and endpoint verification mechanisms designed to ensure the confidentiality, integrity, and availability of data exchanged between system components. These mechanisms may include token-based access control, TLS encryption, digital signatures, and firewall configurations. Network 105 may also support real-time message broadcasting, event subscriptions, or publish-subscribe architectures in support of live updates and interactive collaboration workflows.

In various embodiments, Allocation Server 110 may function as the primary processing environment and orchestration engine for system 100. The server may be implemented using one or more computing nodes operating in a monolithic, modular, or microservice-based architecture. The deployment topology may vary by enterprise need and may include private data center infrastructure, virtualized environments, public or private cloud hosting, or containerized orchestration.

Allocation Server 110 may comprise or be functionally coupled to one or more processors, memory units, persistent data storage, and runtime environments configured to execute application logic. The server may operate as the control plane of the platform, coordinating the interaction between user-facing components, data integration workflows, validation logic, and governance processes.

In some embodiments, Allocation Server 110 may execute a suite of interrelated services, modules, or subcomponents, including but not limited to a Data Ingestion Layer 111, Rule Evaluation Engine 112, Role and Manager Inference Engine 113, Sandbox and Attestation Manager 114, User Session Coordinator 115, and Hierarchy Visualization Engine 116. These services may run as distinct threads, processes, containers, or logical units and may communicate internally through service meshes, shared data models, or event queues.

In some embodiments, the server may maintain and manage organizational hierarchy data, including real-time and sandboxed views of structural assignments, team configurations, reporting lines, platform compositions, and rule evaluation results. It may provide transactional integrity during user interactions, ensure concurrent change resolution across multiple stakeholders, and log all relevant activity for auditability and allocation history.

In certain implementations, the server may support fault-tolerant behaviors such as retry logic, message deduplication, and eventual consistency guarantees across distributed components. It may include system health monitors, alert generation mechanisms, and integration with observability platforms to provide metrics on system performance, data latency, rule evaluation throughput, and user activity patterns.

Allocation Server 110 may expose APIs or user interface endpoints through which clients can interact with planning data, initiate changes, retrieve exception reports, or participate in attestation workflows. In some embodiments, the server may also support administrative operations, such as rule template management, role-based access configuration, report export customization, and integration credential provisioning.

In various embodiments, the specific functional components of Allocation Server 110 described herein are intended to be illustrative rather than limiting. More, fewer, or different components may be used depending on system architecture, enterprise integration requirements, or deployment preferences. In some implementations, two or more of the described modules may be combined into a single service or process, while in other implementations, a single described component may be decomposed into multiple cooperating services or independently scalable units. Functional elements such as the inference engine, attestation manager, or session coordinator may be executed together or separately, hosted in different environments, or replaced by equivalents adapted to the particular context. The architectural configuration depicted in FIG. 1 is therefore exemplary and may be varied without departing from the scope of the systems and methods described in this disclosure.

In various embodiments, Data Ingestion Layer 111 may be configured to acquire, normalize, validate, and integrate structured organizational data from one or more Data Sources 140. These sources may include human capital management (HCM) platforms, enterprise resource planning (ERP) systems, organizational directories, contractor or contingent labor platforms, planning spreadsheets, or other structured repositories that provide data relevant to the organizational hierarchy.

In some embodiments, the ingestion layer may support multiple modes of data acquisition, including scheduled batch imports, event-triggered ingestion (e.g., via webhooks or change data capture), and real-time streaming updates from message queues or data pipelines. Interfaces to source systems may be established through secure APIs, database connections, flat-file exchange protocols (e.g., SFTP), or message-based middleware. In some embodiments, ingestion endpoints may support authentication via OAuth, client certificates, or enterprise identity federation.

In some embodiments, data Ingestion Layer 111 may retrieve various types of data, including employee identifiers, job codes, role designations, reporting relationships, team or pod affiliations, platform and practice assignments, grade levels, requisition identifiers, and attestation statuses. These records may also include metadata such as effective dates, approval codes, cost centers, or planning wave identifiers. In some embodiments, the ingestion layer may ingest configuration data, such as job architecture definitions, manager eligibility matrices, or platform design templates.

Upon retrieval, in some embodiments, the raw data may be passed through a transformation process. This may include schema mapping, data type coercion, normalization of identifiers, localization of field values (e.g., currency, title translation), deduplication, and enrichment with derived fields. Transformation logic may be implemented declaratively through configurable templates or imperatively via pluggable modules. In some implementations, custom mappings may be defined per data source, region, or planning phase. To ensure data integrity, in some embodiments, the ingestion layer may perform validation operations during the import process. These may include checks for mandatory fields, field format conformity, reference resolution (e.g., whether each "Reports To" entry maps to a known individual), and business logic validation (e.g., no role is assigned without a platform). Invalid records may be rejected or quarantined, with errors logged to an ingestion exception log. Validated records may be stored in an intermediate staging area or passed directly to downstream modules, such as Rule Evaluation Engine 112 or Role and Manager Inference Engine 113.

In some embodiments, Data Ingestion Layer 111 may maintain version history or delta records of all ingested data, enabling rollback of changes or comparative analysis of planning cycles. Each ingestion operation may be tagged with metadata such as timestamp, data source, ingest context, and transformation schema version. This information may be surfaced in administrative views for monitoring ingestion activity and troubleshooting data integration issues.

In enterprise environments where multiple data sources may conflict, the ingestion layer may apply source prioritization rules to resolve discrepancies. For example, authoritative HR systems may override spreadsheet inputs unless a user has explicitly opted into a manual override context. These conflict resolution policies may be configurable at the system, region, or planning wave level.

In certain embodiments, the ingestion layer may emit events when data is ingested, triggering validation routines, hierarchy updates, or session refreshes in connected components. This event-driven model may facilitate real-time responsiveness and cross-module synchronization. In cloud-native implementations, ingestion processes may be containerized and horizontally scalable, with load-balanced workers polling source systems or consuming data from ingestion queues.

In various embodiments, Rule Evaluation Engine 112 may be configured to evaluate the structural, policy, and compliance validity of data within the organizational hierarchy. This engine may apply a configurable set of business rules to validate that assignments, reporting relationships, and group structures conform to organizational governance standards, platform-specific constraints, and human resources policies. Rule Evaluation Engine 112 may operate in real-time, on-demand, or in batch mode depending on the nature of the triggering event, system configuration, or planning phase.

In some embodiments, rules evaluated by the engine may span multiple layers of the organizational structure. At the individual level, rules may validate whether each employee is assigned a valid reporting line, whether their role is appropriate for their grade level or practice, and whether they are assigned to an active and attested platform. At the group level, rules may validate whether a pod or service delivery group (SDG) includes the required distribution of roles, meets minimum team size constraints, or satisfies geographic diversity thresholds. At the platform level, the engine may validate that overall team composition adheres to predefined leadership-to-staff ratios, spans of control, and cross-functional participation requirements.

In some embodiments, rules may be defined declaratively using configuration files, rule tables, or graphical interfaces. Each rule may include parameters such as the target entity type (e.g., employee, team, platform), evaluation condition (e.g., "must report to a manager within the same practice"), severity level (e.g., warning, blocking, critical), scope (e.g., applicable to specific grades or regions), and remediation instructions. In other embodiments, complex rules may be implemented procedurally, using scriptable or compiled functions that accept one or more data records as input and emit structured validation results. Rule Evaluation Engine 112 may maintain a registry of all active rules, along with metadata indicating rule ownership, version, applicability criteria, and change history. This registry may be accessed by system administrators, compliance officers, or authorized users for the purposes of review, auditing, or tuning. In some implementations, rules may be categorized by type—such as structural, eligibility, attestation enforcement, or reporting integrity—and organized into hierarchical rule sets that allow inheritance or override at different organizational levels.

In operation, Rule Evaluation Engine 112 may consume data from Data Ingestion Layer 111, user-triggered changes from Hierarchy Visualization Engine 116, or modified records staged in Sandbox and Attestation Manager 114. For each entity under evaluation, the engine may determine the applicable rule set, fetch any required context or reference data, and evaluate the rule logic. Evaluation outcomes may include binary pass/fail results, severity-ranked exceptions, and in some cases, diagnostic metadata such as affected fields, failure context, and links to applicable policy documentation.

In some embodiments, failed validations may be stored in an exception log, flagged visually within the interface, or routed to downstream modules for attestation, remediation, or escalation. In various embodiments, exception records may include identifiers for the affected entity, the violated rule, rule metadata, the time of evaluation, the user (if applicable), and the outcome of any related override or attestation. The system may support tracking of rule compliance trends across planning waves, organizational units, or business cycles, enabling advanced analytics on structural health and policy adherence.

In certain embodiments, the rule engine may execute in response to event-driven triggers, such as employee reassignment, role change, or reporting line modification. In other embodiments, users may invoke validation manually for a single entity, a filtered subset of the hierarchy, or an entire planning scenario. Batch evaluations may be conducted prior to data promotion, during governance review checkpoints, or as part of nightly compliance scans.

To support scaling, in some embodiments, Rule Evaluation Engine 112 may be implemented as a stateless service capable of parallel execution across multiple processing threads or compute nodes. Evaluation jobs may be distributed across a processing queue and may report partial results incrementally. In enterprise-scale deployments, the engine may maintain evaluation caches or checkpointed validation states to minimize recomputation and improve responsiveness. Rule Evaluation Engine 112 may also expose administrative interfaces for configuring rule metadata, monitoring evaluation activity, and inspecting exception history. In some embodiments, rules may be version-controlled and support "dry run" mode, allowing system operators to test rule impact against historical or sandbox data without producing user-facing violations.

In various embodiments, Role and Manager Inference Engine 113 may be configured to automatically determine expected job roles and reporting line managers for individuals within the organization, based on a combination of structured organizational data, job architecture models, historical assignment patterns, and system-defined eligibility rules. The inference engine may operate in response to data ingestion events, user-initiated actions, or structural changes made within the sandbox planning environment.

For role inference, in some embodiments, the engine may evaluate an employee's grade level, practice assignment, platform affiliation, job family, business unit, and geographic location to determine one or more likely roles from a predefined role mapping structure. This structure may be defined in the system's job architecture model and may be scoped by geography, functional domain, or planning wave. In some embodiments, inference may be deterministic—such that a given grade within a specified practice maps directly to a single role—or probabilistic, where several role candidates are evaluated and ranked based on a scoring function. The role inference scoring function may take into account organizational norms, past assignment frequency, platform-specific distributions, and similarity to peer profiles. For example, if 85% of employees with similar attributes were assigned to "Senior Analyst," that role may be given precedence. In some implementations, the engine may also incorporate feedback from previous inference accuracy or attestation outcomes, refining future recommendations based on confirmation history.

For manager inference, in some embodiments, the engine may analyze the organizational hierarchy, platform structure, and reporting chains to identify valid candidate managers. These candidates may be filtered based on eligibility rules, such as minimum grade level, platform leadership designation, practice authority, or span-of-control limitations. In dual-manager environments, the engine may evaluate and assign both functional and operational managers (e.g., a practice manager and a platform manager), ensuring that each manager type satisfies the respective eligibility constraints. If multiple eligible managers are found, the system may apply ranking logic based on proximity in the reporting hierarchy, team alignment, historical reporting assignments, and manager workload. In some embodiments, user-defined manager preferences or platform-specific heuristics may influence the final selection. If no valid manager is found, the engine may generate a placeholder assignment, trigger an exception, or flag the employee record for manual resolution.

In certain configurations, Role and Manager Inference Engine 113 may support override detection and audit logging. If a user manually assigns a role or manager that differs from the system's inferred recommendation, the override may be captured along with the inferred value, the assigned value, and the user justification, if provided. Overrides may be subject to revalidation, attestation, or inclusion in compliance reports, depending on administrative settings.

In some embodiments, the engine may operate in both real-time and batch modes. In real-time mode, it may return inferences on demand in response to record changes or UI interactions. In batch mode, the engine may process an entire planning wave or filtered subset of the hierarchy, populating missing assignments and manager relationships en masse. The output of batch inference may be written to a sandbox, previewed by planners, or promoted directly to the live hierarchy if appropriately attested. Role and Manager Inference Engine 113 may interact closely with other system components. It may consume data from Data Ingestion Layer 111, retrieve job architecture mappings from a central repository, respond to rule results from Rule Evaluation Engine 112, and write inference results into the hierarchy model for display by Hierarchy Visualization Engine 116. In some embodiments, inference actions may also trigger downstream workflows, such as notifying users of incomplete assignments, suggesting corrective actions, or pre-filling forms during manual reassignment operations.

To support extensibility and variation across organizations, in some embodiments, the inference engine may allow administrators to define inference rules and mappings through a graphical interface or configuration layer. These mappings may be versioned, scoped by business unit or geography, and linked to specific roles, job families, or planning waves. The inference engine may also support fallback mechanisms, such as assigning default roles in underconfigured areas or escalating unresolved assignments to exception management workflows.

In various embodiments, Sandbox and Attestation Manager 114 may support two distinct but interconnected system functions: (1) a sandbox environment for modeling uncommitted structural changes to the organizational hierarchy, and (2) an attestation subsystem for managing structured review and confirmation workflows relating to those changes. Together, these functions may enable users to preview, validate, and formally approve proposed assignments before those changes are promoted to the live organizational structure.

The sandbox functionality may allow users to stage hypothetical or planned changes to the hierarchy in an isolated environment. These changes may include role reassignments, reporting line modifications, platform realignments, or team-level restructuring. In some embodiments, a sandbox may be scoped to a single user, a planning team, a platform, or an organizational segment, allowing for concurrent sandbox planning by multiple stakeholders. Each sandbox may represent a working copy of the hierarchy, incorporating live data and overlaying uncommitted edits, which may be stored separately or tagged within a unified data structure.

In some embodiments, changes made in the sandbox may be automatically or manually validated by Rule Evaluation Engine 112, allowing users to preview rule violations, assess compliance impacts, and iterate on their plans prior to finalization. The system may visually distinguish sandboxed content from production data in Hierarchy Visualization Engine 116, using styling indicators, filters, or toggle controls. In some embodiments, users may compare current and proposed structures side by side or simulate cascading effects of changes (e.g., reporting line shifts or platform coverage imbalances).

In various embodiments, once sandboxed changes are deemed ready for review, Sandbox and Attestation Manager 114 may initiate an attestation workflow. Attestation, in this context, refers to the formal confirmation of the validity, appropriateness, and compliance of a given assignment or set of changes by an authorized stakeholder. Attestation may be required for one or more of the following: a new reporting line, a role reassignment, a platform transfer, or any change that either triggers a rule violation or originates from an untrusted source (e.g., spreadsheet import or override action).

In some embodiments, each attestation item may be represented as a discrete unit containing structured metadata, including the target entity (e.g., employee or team), the proposed change, the previous value, validation status, inferred alternatives (if any), timestamp of creation, and relevant justification data. The attestation workflow may route these items to designated approvers, such as platform leads, HR business partners, or practice managers, based on role assignment, data ownership, or administrative policy. Approvers may interact with attestation queues via a dashboard or task list. Each item may be reviewed in context, with the system surfacing any associated rule violations, inference results, or upstream dependencies. Actions available to the approver may include approving the change, rejecting it with a comment, escalating it to a secondary reviewer, or requesting additional validation. In some embodiments, bulk attestation may be supported, enabling approvers to confirm multiple related assignments simultaneously based on shared attributes.

In some embodiments, attestation outcomes may be logged in an immutable audit trail, capturing the reviewer's identity, decision, timestamp, rationale (if provided), and the associated planning wave or organizational segment. These logs may be queryable for audit, compliance, or historical analysis purposes. In certain configurations, an attestation may trigger conditional workflows-such as enabling promotion to production state, suppressing further validation, or generating a compliance flag for downstream reporting.

Sandbox and Attestation Manager 114 may also include configurable policies governing when attestation is required, who may attest to a given change, and what happens in the event of attestation failure or inaction. For example, changes involving platform reassignments may require dual attestation from both the platform lead and the HR partner. Changes not attested to within a specified time window may be escalated to an executive reviewer or reverted to a prior state. These policies may be scoped by planning wave, business unit, geography, or grade level, and may be managed through administrative interfaces.

In some embodiments, attested records may be promoted from the sandbox to the production hierarchy once all required attestations are complete and validations are passed. This promotion may be manual, automatic, or rule-triggered and may optionally initiate downstream synchronization workflows to external systems of record. In other implementations, sandbox content may remain isolated indefinitely for scenario planning, historical modeling, or draft iterations not intended for deployment.

The functionality provided by Sandbox and Attestation Manager 114 may be implemented as a combination of services responsible for data isolation, approval routing, metadata management, policy enforcement, and workflow coordination. These services may be integrated with session context via User Session Coordinator 115 and rendered in the user interface through Hierarchy Visualization Engine 116. In cloud-native deployments, attestation logic may scale elastically to support large organizations with complex, multi-stage approval chains.

In various embodiments, User Session Coordinator 115 may be configured to manage session-level data, enforce access control policies, maintain user interface state, and personalize the platform experience for each authenticated user. This component may function as the central point of coordination for translating user role, identity, and permissions into real-time platform behavior, ensuring that each user interacts with a tailored, policy-compliant view of the organizational hierarchy.

Upon user login, in some embodiments, the session coordinator may authenticate the user against one or more identity providers. These may include corporate single sign-on (SSO) systems, OAuth providers, Active Directory integrations, or other enterprise authentication platforms. The authenticated session may be associated with a set of attributes including role assignment, permission group, business unit affiliation, platform or practice scope, region, and any delegated authorities. These attributes may be retrieved from user metadata stores, directory services, or platform-specific configuration tables.

Based on the assigned role and scope, User Session Coordinator 115 may enforce access control across data, functions, and user interface components. For example, a platform lead may have permission to view and attest to team-level assignments within their designated platform but may be restricted from accessing cross-practice assignments or modifying enterprise-wide role mappings. An HR administrator, by contrast, may be granted global visibility and edit privileges across multiple regions and organizational layers. Access control may be implemented through a combination of frontend interface constraints, backend API guards, and dynamic filtering logic.

In some embodiments, the session coordinator may be responsible for controlling what portions of the hierarchy are visible to the user in Hierarchy Visualization Engine 116. For example, users may be limited to viewing only their direct reports, specific pods, or a scoped platform. The session coordinator may apply these constraints when responding to data queries, structuring view filters, or rendering drill-down interactions. These constraints may dynamically adjust in response to context changes, such as switching planning waves, toggling between sandbox and production views, or temporarily assuming delegated responsibilities.

User Session Coordinator 115 may also persist and restore user interface preferences across sessions and devices. These preferences may include selected filters (e.g., showing only unassigned employees), hierarchy expansion state (e.g., which nodes are expanded), layout preferences (e.g., tree view versus pod view), and UI configuration such as column visibility or color themes. Preference data may be stored locally in client-side caches or centrally in user profiles managed by the server, depending on deployment architecture.

In collaborative scenarios, the session coordinator may track and display user activity indicators, such as "currently editing" flags, shared sandbox participation, or real-time notifications regarding overlapping changes. In some implementations, session data may include advisory locks or soft-state indicators to prevent conflicting edits or unintended overwrite operations. These features may support parallel planning workflows involving multiple users working on intersecting segments of the hierarchy.

In certain embodiments, User Session Coordinator 115 may also manage the routing of alerts, task queues, or attestation requests to the appropriate user based on session attributes. For example, pending attestations that fall within a user's approval scope may be surfaced as action items upon login or delivered as part of a real-time notification system. The coordinator may track when such items are reviewed, dismissed, or deferred, and update the associated audit records accordingly.

To support system observability and compliance, in some embodiments, the session coordinator may log session metrics, including login time, session duration, pages visited, filters applied, actions performed, and data access frequency. These logs may be used to detect anomalous behavior, generate usage reports, or inform product improvements. In secure environments, session data may also support forensic audits and data breach response analysis. Session expiration, timeout, and idle behavior may be governed by administrative policy. For example, sessions may be automatically terminated after a period of inactivity, and reauthentication may be required to access sensitive functions such as export, override, or sandbox promotion. The session coordinator may handle these transitions gracefully, preserving unsaved changes and restoring the interface upon reauthentication when permitted.

In some implementations, User Session Coordinator 115 may be extensible through administrative interfaces that allow system owners to define new user roles, configure access policies, assign planning wave permissions, or apply scoped restrictions to features based on region, business unit, or user seniority. These configurations may be versioned, audited, and enforced centrally at runtime.

In various embodiments, Hierarchy Visualization Engine 116 may be configured to generate and render a real-time, interactive visual representation of the organizational structure maintained within system 100. This visualization may enable users to explore, analyze, validate, and manage reporting relationships, platform structures, role assignments, and compliance indicators using a graphical interface. The visualization engine may serve as the primary interface layer for structural planning, exception resolution, attestation workflows, and scenario comparison across various planning phases.

In some embodiments, Hierarchy Visualization Engine 116 may retrieve its input data from a combination of live organizational records, sandboxed planning states, and validated rule results. These inputs may include employee identifiers, job titles, role codes, grade levels, reporting line data, team affiliations, platform assignments, attestation statuses, and structural exception markers. The engine may organize this data into a hierarchical graph or tree structure, wherein nodes represent individuals, teams, or groups, and edges represent reporting or structural relationships.

In some embodiments, the engine may support multiple layout modes, including vertical tree views, horizontal swimlane views, nested pod visualizations, or matrix views that reflect cross-functional reporting. Each node may be rendered with visual attributes such as name, role, platform, grade, and current attestation or validation status. Visual styling may include color-coded indicators, icon overlays, badges, and tooltips, which may be used to indicate rule violations, sandboxed modifications, pending attestations, or other planning states. For example, a red exclamation icon may denote a structural rule violation, while a yellow triangle may indicate a missing or pending attestation.

The visualization engine may support a range of user interactions. In various embodiments, users may click, hover, or right-click on nodes to open contextual menus or detail panels. These panels may allow users to view underlying data, propose changes (e.g., reassigning a role or manager), view rule violations, launch attestation workflows, or compare sandboxed and production states. Authorized users may be permitted to directly manipulate the hierarchy through drag-and-drop interactions, dropdown selectors, or in-line edits, subject to session-based permissions enforced by User Session Coordinator 115.

To support scalability, in some embodiments, Hierarchy Visualization Engine 116 may implement virtual scrolling, incremental node loading, or node clustering techniques to render only visible portions of large hierarchies. In some embodiments, the engine may support on-demand expansion of hierarchy branches, zoom and pan controls, minimap overviews, or breadcrumb navigation to allow users to efficiently traverse deeply nested or cross-linked organizational structures.

The engine may be tightly integrated with Rule Evaluation Engine 112 and Sandbox and Attestation Manager 114. When validation failures occur, the engine may retrieve exception metadata and display the corresponding rule violations inline. Users may click on these indicators to view rule descriptions, violation context, and suggested remediations. When changes are made within sandbox mode, nodes may be visually marked (e.g., shaded differently or flagged) to indicate that they are not yet committed. Users may also toggle between sandbox and production views, or overlay differences between them using highlight modes or diff views.

In some embodiments, the visualization engine may provide filtering and search capabilities. Filters may be applied by user-defined criteria, such as role, grade, platform, exception type, manager, geographic location, or attestation status. The search interface may support free-text queries, multi-attribute lookups, or compound filters using logical operators. These features may enable users to isolate subsets of the hierarchy for review, attestation, or export.

In some embodiments, export functionality may also be provided. Users may generate visual snapshots, structured data tables, or filtered reports in formats such as PDF, PNG, SVG, Excel, or JSON. Exported data may include visual renderings, tabular breakdowns, compliance summaries, or metadata describing rule exceptions and attestation outcomes. Exports may be used for executive briefings, audit records, or integration with third-party systems.

Hierarchy Visualization Engine 116 may be implemented using web-based technologies such as HTML5, JavaScript, WebGL, or SVG, and may operate within a browser or embedded application container. It may connect to backend services via secure APIs or WebSocket channels to fetch data, receive validation feedback, and submit user actions for processing. In some configurations, rendering logic may be offloaded to the client to improve responsiveness, with server-side verification of critical actions.

To support enterprise deployment, the engine may include accessibility features (e.g., keyboard navigation, screen reader compatibility, high-contrast themes), localization options (e.g., multilingual text rendering), and customizable branding elements. In some embodiments, interface elements may be configured administratively to simplify the experience for different user roles, hiding advanced features from non-technical users while enabling full access for administrators or planners.

Hierarchy Visualization Engine 116 may serve as both the visual front-end and operational control surface for interacting with the hierarchical model, enabling rich, context-aware planning and governance workflows with minimal reliance on external tools or manual data handling.

In various embodiments, User Devices 130 may include any computing device through which users interact with system 100. These devices may serve as endpoints for accessing the user interface, rendering the organizational hierarchy, and participating in planning, validation, attestation, and approval workflows. User Devices 130 may include, without limitation, desktop computers, laptop computers, tablet computers, smartphones, or thin-client terminals operating in a browser-based or native application environment.

User Devices 130 may be used by a variety of stakeholders, including but not limited to platform managers, HR representatives, practice leads, system administrators, finance or resource allocation personnel, and executive reviewers. In some embodiments, user access may be governed by role-based permissions, with different roles exposed to different scopes of data, interface capabilities, and allocation responsibilities. For example, a practice lead may be restricted to viewing and attesting to records within a designated function, while an HR administrator may be permitted to approve or override structural changes across the enterprise.

In some embodiments, each user device may connect to Allocation Server 110 via network 105, using encrypted protocols such as HTTPS, VPN tunnels, or enterprise-secured endpoints. The system may require authentication at login, with supported authentication mechanisms including enterprise SSO (Single Sign-On), OAuth tokens, SAML assertions, or multi-factor authentication workflows. In some implementations, users may be required to register their devices or access the platform through a managed device environment, depending on organizational security policy.

In various embodiments, the user interface displayed on User Devices 130 may be responsive and adaptive, allowing for consistent interaction across form factors and screen sizes. For example, desktop users may access full-featured dashboards and drag-and-drop hierarchy tools, while tablet and mobile users may be presented with a simplified layout optimized for touch input and smaller displays. Accessibility options may include high-contrast themes, screen reader compatibility, keyboard-only navigation, and customizable visual display settings.

In some embodiments, one or more User Devices 130 may enable users to perform a wide range of actions, including viewing the live or sandboxed organizational hierarchy, assigning or reassigning roles and reporting lines, reviewing rule violations flagged by Rule Evaluation Engine 112, approving or rejecting attestation items surfaced by Sandbox and Attestation Manager 114, and downloading or exporting filtered hierarchy views. Interface behavior and available workflows may be dynamically adjusted based on the user's current session, as managed by User Session Coordinator 115.

In some embodiments, the system may track and log actions initiated from User Devices 130, including user navigation, data modification, rule override attempts, attestation approvals, and export activity. These logs may be stored for audit compliance, session diagnostics, or performance analytics. The system may also display to users a personalized dashboard summarizing their open tasks, exceptions requiring attention, and allocation wave progress indicators relevant to their role.

User Devices 130 may support notification delivery, either within the application (e.g., in-app alerts) or through integrated enterprise messaging platforms such as Microsoft Teams, Slack, or email. These notifications may inform users of pending attestations, newly surfaced exceptions, required approvals, or upcoming allocation deadlines.

In enterprise deployments, access from User Devices 130 may be constrained by network location, device compliance posture, or organizational policy. For example, access to attestation or override functionality may be disabled when the device is operating outside a corporate network or when certain endpoint security checks are not met. These controls may be enforced through policy servers or endpoint management tools.

In some embodiments, User Devices 130 may also support delegated access, where one user may act on behalf of another for specific tasks, such as approving assignments during planned absence. Delegation privileges and audit trails may be managed by administrative controls and enforced through the session logic of User Session Coordinator 115. User Devices 130 are therefore not merely interface endpoints but active participants in organizational governance workflows, enabling users across multiple roles to collaborate in real time, review and attest to structural data, and ensure policy-compliant execution of allocation objectives.

In various embodiments, Data Sources 140 may include one or more external or internal systems of record from which organizational data is ingested, validated, or synchronized by system 100. These sources may provide the authoritative foundation upon which the platform's hierarchy is constructed and maintained. The integration of Data Sources 140 with Allocation Server 110—via Data Ingestion Layer 111—may enable near-real-time alignment with enterprise-wide data systems and reduce reliance on manual data entry or duplication.

Data Sources 140 may include, without limitation, human capital management (HCM) platforms such as Workday, SAP SuccessFactors, or Oracle HCM; enterprise resource planning (ERP) systems that manage financial hierarchies and cost centers; identity and access management systems such as Active Directory or Okta; and collaboration or workflow systems used for allocation, approvals, or headcount tracking. In some embodiments, spreadsheet-based allocation tools or shared drive folders may also serve as data sources, particularly during early phases of allocation waves or in federated data environments.

In some implementations, each data source may expose a structured data interface such as a RESTful API, a SOAP web service, a JDBC/ODBC connection, a file drop protocol (e.g., SFTP), or a cloud storage bucket (e.g., AWS S3, Azure Blob). These interfaces may be accessed directly by Data Ingestion Layer 111, which may apply connector-specific logic to retrieve, normalize, and transform incoming data into a format usable by the internal hierarchy model.

In some embodiments, data retrieved from Data Sources 140 may include employee master data, job architecture definitions, role-to-grade mappings, historical reporting chains, cost allocation structures, attestation history, allocation wave metadata, and other configuration parameters. The ingestion of these records may be performed in bulk or incrementally, and may occur on a scheduled basis, in response to data change events, or as part of user-triggered refresh operations.

To support complex integration requirements, in some embodiments, system 100 may define ingestion pipelines or modular adapters for each data source. These adapters may encapsulate schema mapping logic, field transformation rules, default value handling, and source-specific validation policies. In some embodiments, administrators may configure data source behavior through declarative metadata files or graphical interfaces that specify source precedence, schema versions, transformation scripts, and ingestion frequency.

In enterprise environments, different data sources may provide overlapping or conflicting information. For example, a role assignment may exist in both an HCM system and a allocation spreadsheet, but with differing platform associations. In such cases, Data Ingestion Layer 111 may apply source prioritization rules or merge policies to resolve conflicts. These rules may be defined per data field, per allocation wave, or based on data freshness, user override markers, or validation history.

In various embodiments, the system may also support outbound synchronization from system 100 to one or more Data Sources 140. This write-back capability may be used to update external systems with finalized role assignments, confirmed reporting relationships, or attested platform configurations. Outbound updates may be governed by configurable export policies and may require attestation completion, rule compliance, or administrative approval before execution.

To enable secure and reliable operation, the system may implement authentication, authorization, and encryption controls on all communications with Data Sources 140. For example, data pull operations may require API tokens or signed credentials, and write-back operations may be gated by role-based access controls, audit logs, and approval workflows. System 100 may also include integration health checks, error queues, retry logic, and monitoring dashboards to ensure availability and reliability of source data interfaces.

In some embodiments, Data Sources 140 may be classified into categories such as "authoritative," "reference," or "supplemental," each with defined constraints on how their data is used. For example, authoritative sources may be treated as the source of truth for employee identifiers and reporting lines, while supplemental sources may contribute optional metadata such as project tags or headcount targets. These classifications may influence validation, conflict resolution, and user override logic.

The system may expose integration logs or audit trails for each data source, enabling administrators to review past sync operations, inspect rejected records, and track field-level data lineage. This transparency may be essential for satisfying audit requirements, reconciling allocation discrepancies, or responding to governance inquiries.

By supporting flexible, scalable, and secure integration with a variety of enterprise systems, Data Sources 140 may allow system 100 to operate as an authoritative overlay to existing business systems-offering dynamic validation, visual allocation, and compliance attestation without requiring wholesale replacement of incumbent platforms.

These and other features of system 100 will be further understood with reference to the dynamic organizational hierarchy visualization and attestation method 200 of FIG. 2.

FIG. 2 depicts an example method for a dynamic organizational hierarchy visualization and attestation, in accordance with at least one embodiment. In various embodiments, method 200 may be implemented by system 100, executing code in one or more processors therein. For example, in some embodiments, method 200 may be performed on a computer (e.g., computer system 1000 of FIG. 4) having one or more processors (e.g., processor(s) 1010 of FIG. 4) and memory (e.g., system memory 1020 of FIG. 4), and one or more code sets, applications, programs, modules, and/or other software stored in the memory and executing in or executed by one or more of the processor(s).

At step 210, in some embodiments, the processor may retrieve organizational data from one or more structured data repositories. These repositories may include enterprise systems such as human capital management (HCM) platforms, enterprise resource planning (ERP) tools, employee directories, and allocation spreadsheets. The repositories may store data relevant to the structural organization of personnel, including information about employee identity, job role, reporting relationships, platform or team affiliation, and attestation status.

In some embodiments, the retrieval process may be initiated through scheduled synchronization routines, user actions, or event-driven triggers such as API webhooks or message bus notifications. The processor may connect to the data sources via secure integration mechanisms, including but not limited to RESTful APIs, SFTP file transfers, JDBC queries, or streaming protocols. Connections may require authentication using, e.g., OAuth tokens, SAML assertions, mutual TLS, or enterprise credentials.

In some embodiments, the retrieved organizational data may include one or more of employee identifiers, reporting relationships, role designations, team affiliations, platform assignments, or attestation statuses. In some implementations, additional fields such as job codes, grade levels, cost centers, requisition IDs, business units, or geographic regions may also be retrieved to support downstream inference and validation logic.

In some embodiments, the processor may normalize the retrieved data to conform to an internal schema. This may include field mapping, code translation, type coercion, and application of default values. Where data is sourced from multiple systems with overlapping fields, the processor may apply a source precedence policy or timestamp-based resolution strategy to determine the most reliable value. Each record may be tagged with metadata indicating source system, retrieval timestamp, and data quality indicators. In some embodiments, the retrieved data may be stored in a staging area for transformation, or passed directly to downstream components such as the Role and Manager Inference Engine or Rule Evaluation Engine. In cases where source systems differ in schema or granularity, the ingestion logic may apply configurable transformation pipelines to harmonize and enrich the records prior to use.

At step 220, in some embodiments, the processor may generate a hierarchical data structure representing organizational entities as nodes and reporting relationships as edges, based on the organizational data retrieved at step 210. The generated structure may model the reporting topology of the enterprise, including employees, managers, teams, pods, and platforms, as well as structural relationships such as who reports to whom, who belongs to which team, and how platforms are organized. The processor may use "Reports To" fields and other hierarchical indicators to construct parent-child relationships between employee nodes. Each node may encapsulate metadata such as employee name, role, grade level, job title, platform affiliation, and attestation status. Edges may be used to represent reporting relationships and team membership links. In some embodiments, the processor may generate parallel edge sets for multiple reporting lines, such as both a platform-based work manager and a functionally aligned practice manager.

In various embodiments, the processor may generate group-level nodes that aggregate individual employees into pods, service delivery groups (SDGs), or team clusters. These nodes may be generated automatically based on shared attributes, platform rules, or imported team structures, and may be annotated with group-level metrics such as headcount, location distribution, and leadership coverage.

In some implementations, the hierarchical structure may be persisted in a graph database, document store, or in-memory data model to support rapid traversal, filtering, and visualization. The processor may maintain indexes or mapping tables to enable quick lookups based on employee ID, manager ID, platform, or team. The system may also track historical snapshots or versioned states of the hierarchy to support time-based comparisons or rollback.

In some embodiments, and in support of functionality described in dependent claims, the processor may determine expected roles for one or more employees based on one or more predefined organizational models. This role inference may occur concurrently with structure generation and may involve matching job architecture templates to employees based on grade, department, or platform. In other embodiments, the processor may determine reporting line managers based on the assigned roles and existing organizational context, ensuring that inferred reporting chains are consistent with established governance policies and manager eligibility rules. In some embodiments, this step may establish the foundation for subsequent visualization, validation, and interaction with the organizational model.

At step 230, in some embodiments, the processor may render a user interface comprising a visual representation of the hierarchical data structure generated at step 220. The user interface may be generated by Hierarchy Visualization Engine 116 and may be configured to present a structured, interactive view of the organization's current or proposed state, enabling users to explore the reporting hierarchy, identify structural issues, and manage organizational assignments.

The visual representation may render organizational entities such as employees, teams, pods, or platforms as nodes, and represent their relationships—such as reporting lines or team affiliations—as edges connecting those nodes. The processor may use layout logic to organize the visual hierarchy in formats including vertical trees, nested containers, radial graphs, or collapsible pod structures. In some embodiments, users may toggle between layout modes or apply display preferences based on platform, role, or user type. In some embodiments, each node displayed in the interface may include visual indicators of relevant attributes, such as employee name, title, platform, grade, and attestation status. The processor may apply visual styling to represent data conditions—for example, using colors to indicate role types, border styles to denote sandbox changes, or icons to identify rule violations or pending attestations. In some implementations, graphical indicators may be displayed as tooltips, badges, or icons adjacent to the node (supporting dependent claim 5), enabling users to quickly assess data health and allocation progress.

In various embodiments, the user interface may be interactive, allowing users to hover, click, or tap on nodes to reveal contextual details or access available actions. These interactions may trigger the display of expanded metadata, launch inline editing forms, or open navigation panels. The processor may allow users to drill into teams, expand reporting branches, or collapse unrelated sections to manage visual complexity.

In some configurations, the processor may also render user interface components for applying filters, initiating searches, or triggering workflow actions. These components may include dropdown menus, sidebars, dashboards, or navigation breadcrumbs. The interface may be responsive across device types and screen sizes and may support accessibility features such as keyboard navigation and screen reader compatibility.

In embodiments where the structure includes sandboxed changes, the user interface may include visual differentiation for uncommitted data, such as alternative node styles, overlays, or a toggle to view production versus sandbox states. The user interface may also highlight structural deltas when comparing current and prior states or during attestation review. Rendering may be optimized to support dynamic updates, real-time user interactions, and hierarchical structures with large numbers of nodes. The processor may perform incremental rendering, virtual scrolling, or lazy loading of subtrees to ensure performance and responsiveness, particularly in environments involving multi-thousand-employee hierarchies.

In some embodiments, this interface may serve as the primary surface through which users interact with the hierarchy, perform validations, resolve exceptions, and manage attestation workflows. It may be continuously updated in response to user input, back-end validation results, or changes retrieved from connected systems.

At step 240, in some embodiments, the processor may detect one or more changes in the organizational data and update the hierarchical data structure and visual representation in response to the one or more changes. These changes may originate from a variety of sources, including but not limited to newly ingested data, user-initiated modifications, attestation outcomes, rule-triggered corrections, or sandboxed edits awaiting promotion.

In various embodiments, the processor may monitor change events generated by Data Ingestion Layer 111, user actions captured through the interface, or system-internal workflows (e.g., inferred role updates or attestation approvals). The change detection mechanism may operate through polling, event-driven notifications, or differential comparison between data snapshots. In some implementations, change detection may occur at the record level, field level, or hierarchical relationship level, depending on system configuration.

When a change is detected, the processor may evaluate whether the change impacts the structure or metadata of one or more nodes within the hierarchy. Examples of impactful changes may include reassignment of reporting lines, creation or removal of teams, assignment of a new platform, correction of a previously invalid role, or confirmation of an attestation item. The processor may identify which entities are affected by the change and update their relationships, attributes, or visual presentation accordingly.

In some embodiments, structural changes may require re-generation or partial re-rendering of the hierarchical data structure. The processor may recalculate parent-child relationships, propagate updates through downstream references (e.g., inherited platform context), or re-run associated inference or validation routines to maintain structural integrity. For example, if an employee is assigned a new manager, the processor may recompute team membership, leadership ratio, and team-level rule compliance, and flag nodes impacted by any resulting rule violation.

In some embodiments, the visual representation of the hierarchy may be updated in parallel with the data structure. Hierarchy Visualization Engine 116 may identify the affected portion of the display graph, redraw modified nodes, animate structural transitions, or update styling to reflect the new state. These updates may include changes to node color, badge content, icon overlays, attestation indicators, or display of new or removed relationships. In user-facing deployments, the update process may be rendered in near real-time, giving the appearance of a live, self-adjusting interface. In some embodiments, the processor may debounce or batch incoming changes to reduce rendering overhead, particularly in high-activity environments. The system may also notify the user of background changes, offer synchronization prompts, or automatically reconcile interface state with underlying data changes.

In collaborative environments, the processor may track changes initiated by other users and determine whether the current user's view should reflect those changes immediately. The system may use soft-locks, session scopes, or change indicators to help avoid editing conflicts. In cases where conflicting changes occur (e.g., two users reassign the same employee simultaneously), the system may resolve the conflict using a configured arbitration policy, log both versions for review, or prompt manual intervention.

At the conclusion of this step, the hierarchy model and its visual representation remain synchronized and reflect the most recent state of the organization's structure, enabling users to work with accurate, validated, and actionable data.

At step 250, in some embodiments, the processor may apply a set of compliance rules to the hierarchical data structure to identify rule violations. These rules may represent organizational guardrails, policy constraints, business requirements, or structural expectations intended to ensure that the hierarchy remains valid, maintainable, and aligned with enterprise governance standards. In some embodiments, the processor may initiate rule evaluation through Rule Evaluation Engine 112. The engine may operate over the entire hierarchy or over a scoped subset of nodes and relationships based on recent changes, user actions, or administrative triggers. The rule set may include both static rules—defined by configuration or policy—and dynamic rules—derived from contextual logic or real-time organizational conditions.

In some embodiments, rules may be scoped to individual employees. Examples of such rules may include verifying that an employee has a valid reporting line, is assigned to a role appropriate to their grade level or job family, and is affiliated with an active platform or team. These rules may also validate that required attributes (e.g., role designation or manager ID) are present and conform to allowed values.

In other embodiments, rules may operate at an aggregate level—evaluating teams, pods, or entire platforms. These platform-level validations (as supported by dependent claim 6) may include rules such as minimum and maximum team size, leadership-to-staff ratio, geographic or functional diversity, practice alignment, and platform headcount balance. Rule granularity may be configurable, and rule applicability may vary by geography, business unit, or allocation wave.

In some embodiments, each rule may be defined with a target scope (e.g., employee, team, platform), a condition expression, one or more triggering attributes, and a severity level (e.g., informational, warning, critical). The processor may execute each rule against the appropriate nodes in the hierarchy and evaluate whether the current structure satisfies the rule's conditions. For rules involving thresholds or limits (e.g., "team must have at least one leadership role"), the processor may aggregate the relevant node attributes before applying the rule logic. If a rule violation is detected, the processor may generate a structured violation record. This record may include the rule identifier, the affected node or relationship, the expected versus actual values, the timestamp of evaluation, and any metadata required to support resolution. Violation records may be written to an exception tracking log, surfaced in the user interface, and/or passed to Sandbox and Attestation Manager 114 for remediation workflows or reviewer approval.

In some implementations, the processor may support prioritization of rule evaluation. For example, blocking rules that affect structural validity may be evaluated and surfaced immediately, while advisory rules may be batched or deferred. The processor may also allow users to selectively re-run rules over specific parts of the hierarchy during allocation cycles, approval gates, or simulation reviews.

In various embodiments, the rules may be configurable by administrators, who may define rule templates, assign rule ownership, and monitor evaluation results over time. The system may support rule versioning, history tracking, and analytics to measure rule effectiveness, rule failure frequency, or compliance trends across allocation periods. In some embodiments, the output of this step provides the foundational logic for ensuring policy-aligned organizational allocation, feeding directly into visualization, attestation, and resolution workflows.

At step 260, in some embodiments, the processor may identify one or more nodes associated with data points that have pending or missing attestations. Attestation, in this context, refers to the formal review and confirmation by an authorized stakeholder—such as a platform lead, HR partner, or practice manager—of a structural assignment within the organizational hierarchy, such as a role designation, reporting relationship, platform affiliation, or team assignment.

In various embodiments, the processor may evaluate each node within the hierarchy to determine whether an attestation is required and whether that attestation has been completed. Nodes may be flagged for attestation due to specific change events (e.g., a reassignment), rule violations (e.g., invalid manager), data source conflict (e.g., conflicting reporting lines), override actions (e.g., manual role assignment differing from inference), or system policy (e.g., platform change requires review).

The criteria for determining whether an attestation is required may be governed by configuration settings managed within Sandbox and Attestation Manager 114. These criteria may include scope-based logic (e.g., changes affecting high-level roles), policy-driven thresholds (e.g., grade level above a certain tier), or change provenance (e.g., records sourced from spreadsheets may require additional scrutiny). The processor may evaluate these rules during allocation workflows, sandbox sessions, or upon promotion of data from staging to production. To identify pending or missing attestations, in some embodiments, the processor may inspect each node for associated attestation metadata. This metadata may include attestation status (e.g., "Pending," "Approved," "Rejected"), reviewer identity, timestamp, comments, escalation status, and change history. If a node lacks required metadata or if the attestation status indicates the change has not been approved, the processor may flag the node as requiring further action.

In some embodiments, the processor may also track expiration or re-attestation conditions. For example, a role assignment attested to in a previous allocation wave may need to be reconfirmed if a new platform realignment is proposed. The system may support configurable expiration intervals, such that attestations are only considered valid within a specified time window or until a dependent change is detected.

The processor may write the results of this evaluation into an attestation state registry and mark each node accordingly. These markings may be surfaced in the hierarchy visualization via iconography, border styling, badge overlays, or tooltips. In some configurations, attestation state may affect downstream workflows, such as blocking promotion of unapproved records, disabling export, or triggering reminder notifications.

In embodiments aligned with dependent claim 8, the processor may support identification of attestation requirements within a simulation or sandbox environment. For example, changes staged in the sandbox may be analyzed for attestation completeness before being eligible for commit to the production hierarchy. The system may require users to explicitly attest to one or more simulated changes, or to defer attestation to designated reviewers.

In some embodiments, the identification of pending or missing attestations may be helpful for governance over organizational changes, especially in high-risk contexts such as platform migrations, leadership reshuffles, or compliance-sensitive allocation phases. The results of this step provide the foundation for targeted attestation workflows, reviewer task assignments, and visual alerts within the allocation interface.

At step 270, in some embodiments, the processor may associate one or more graphical indicators with nodes in the hierarchical data structure that correspond to rule violations or pending attestations. These visual indicators may enable users to quickly identify elements of the organizational hierarchy that require attention, review, or remediation, and may be rendered directly within the user interface generated at step 230.

In various embodiments, the processor may use information generated during step 250 (rule validation) and step 260 (attestation evaluation) to determine which nodes are in a state of non-compliance or awaiting confirmation. For each such node, the processor may assign a corresponding visual marker, which may be rendered by Hierarchy Visualization Engine 116. These markers may be encoded as icons, badges, colored outlines, highlight effects, tooltips, or other stylized elements displayed proximate to the affected node.

In some implementations, graphical indicators for rule violations may vary based on severity. For example, a critical structural violation—such as a reporting cycle or a role misalignment—may be shown as a red exclamation mark icon. A less severe warning—such as an out-of-date role or a missing team affiliation—may appear as a yellow triangle. Informational flags or advisory notes may be indicated with neutral badges or context-aware tooltips. In each case, the processor may retrieve and render the associated rule violation metadata, such as the name of the violated rule, a description of the issue, and a recommended resolution.

Similarly, for attestation status, the processor may display indicators reflecting whether a node has a completed attestation, a pending review, or a rejected confirmation. For example, a green checkmark may represent a successfully attested role assignment, while a gray clock icon may indicate that the attestation is still pending. Nodes with rejected or escalated attestations may be displayed with unique visual styles or dynamic warnings.

In some embodiments, graphical indicators may include visual elements selected from icons, highlights, or tooltips displayed proximate to the affected nodes. Tooltips may provide additional explanatory context when users hover over or select a node, including links to related validation rules, assignment history, or reviewer comments. In some embodiments, tooltips may be dynamically updated to reflect live status changes, such as when a rule is cleared or an attestation is approved.

The graphical indicators may be applied dynamically, with the processor updating visual markers in real time as rules are re-evaluated, attestations are completed, or structural changes are made. This ensures that users always interact with a hierarchy that reflects the current state of compliance and review.

In some configurations, the indicators may be used not only for display but also as interactive controls. Users may click or tap on an indicator to open detailed views, initiate remediation workflows, or perform attestation actions. This integration of visual feedback with workflow control helps streamline resolution and reduce manual searching. In some embodiments, the use of visual indicators may allow users to focus their attention on problematic areas of the hierarchy, prioritize exception handling, and track review progress across allocation waves, thereby enhancing both usability and governance.

At step 280, in some embodiments, the processor may enable user interaction with the user interface to allow users to view, filter, or manage the organizational hierarchy and related data. This interaction may be facilitated through graphical controls rendered by Hierarchy Visualization Engine 116 and may be scoped to the user's access rights and session context, as enforced by User Session Coordinator 115.

In various embodiments, users may view the hierarchy through expandable visual structures, such as tree layouts, pod groupings, or graph-based networks, with each node representing an individual, team, or organizational unit. Users may navigate the hierarchy using mouse, keyboard, or touch input to pan, zoom, expand or collapse nodes, and reveal relationship details. Hover and click interactions may display detailed metadata for the selected entity, including role, grade, platform affiliation, attestation status, and rule compliance indicators.

The processor may also allow users to apply one or more filters to refine the visual presentation. Filtering criteria may include platform, team, grade level, reporting line, geographic region, attestation status, rule violation state, or combinations thereof. In support of dependent claim 4, filtering may also be driven by multi-attribute search queries. For example, a user may enter a query specifying a role, location, and reporting manager, and the processor may interpret this combination to isolate matching nodes. This multi-parameter querying functionality may support both structured filters (e.g., dropdown menus) and unstructured text input with dynamic parsing.

In addition to viewing and filtering, users may manage elements of the hierarchy directly through the interface. For example, a user with appropriate permissions may reassign an employee to a different manager, change a role designation, initiate a platform transfer, or manually resolve a rule violation. These management actions may be executed through contextual menus, editable side panels, drag-and-drop interactions, or inline edit forms embedded within the visualization.

In some embodiments, changes initiated by the user may be staged in a sandbox environment managed by Sandbox and Attestation Manager 114. Users may preview the impact of these changes in real time, revalidate affected nodes, or trigger attestation workflows as necessary. Changes may be tagged with user identifiers, timestamps, and workflow status indicators to support tracking and rollback if needed.

The processor may also support user workflows such as approving or rejecting attestation requests, promoting sandboxed changes to production, initiating bulk actions (e.g., team reassignments), or exporting filtered views of the hierarchy. These actions may be gated by user role, allocation phase, or policy-based permissions. In support of dependent claim 7, users may also interact with summary panels that display aggregated headcount and compensation data grouped by resource type, line of business, or organizational unit. These summaries may be rendered as dashboards, tables, or charts, and may update dynamically based on applied filters or pending changes.

In enterprise deployments, user interaction features may include keyboard shortcuts, accessibility accommodations, role-specific UI configurations, and multilingual support. The processor may persist user settings between sessions and may synchronize interface state across multiple devices or browsers when applicable.

By enabling users to view, filter, and manage the hierarchy through an integrated, interactive interface, the system provides a unified control surface for allocation, compliance, and structural governance across complex organizational environments.

In some embodiments, the processor may enable a simulation environment in which changes to the organizational data may be applied and visualized without immediately altering the underlying structured data repositories. This simulation functionality, sometimes referred to as "sandbox mode," may allow users to test proposed structural changes—such as reassignment of roles, changes to reporting lines, team restructuring, or platform transitions—within an isolated allocation environment.

The processor may instantiate a separate layer of data representing the current allocation session. Changes made within this sandbox environment may be rendered by the user interface alongside or in place of the live hierarchy, with distinct visual indicators (e.g., color overlays, dashed outlines, or status badges) used to distinguish simulated changes from committed production data. The sandbox environment may support version control, change comparison, and side-by-side evaluation of proposed versus actual structures.

While in simulation mode, users may apply role inferences, override assignments, modify team compositions, and resolve rule violations in a controlled, reversible manner. The processor may validate these simulated changes using the same compliance rules described in Step 250 and may surface the results within the sandbox view for iterative adjustment.

In some implementations, sandboxed changes may require confirmation through an attestation workflow prior to promotion. The processor may receive user input attesting to or approving one or more proposed changes. Once all required attestations are completed, the processor may promote the confirmed changes to the production data store and optionally synchronize the updated assignments with one or more external systems of record. The system may restrict promotion of unvalidated or unapproved changes based on configuration.

Simulation functionality may support individual changes, batch updates, or full-wave allocation cycles. In enterprise deployments, multiple users may collaborate within a shared sandbox, and the processor may track user-specific changes, approvals, and comments to maintain accountability. Changes made in simulation may be reversible, auditable, and reportable, supporting organizational agility while preserving structural integrity and governance.

The systems and methods described herein offer concrete improvements over traditional organizational allocation tools by addressing long-standing technical limitations associated with static hierarchy representations, manual validations, and ungoverned structural changes. Conventional technologies used to manage organizational hierarchies often rely on disconnected artifacts—such as spreadsheets, PowerPoint diagrams, or PDF exports—that are manually curated and lack integration with live data systems. These artifacts quickly become outdated, do not support rule-based validation, and provide no mechanism for enforcing structural integrity or verifying managerial decisions. As a result, existing approaches to organizational allocation are labor-intensive, error-prone, and ill-suited to dynamic enterprise environments where roles, reporting lines, and team structures evolve frequently.

The disclosed system improves upon these prior methods by providing a dynamic, interactive, and policy-aware platform for visualizing, validating, and attesting to organizational structures. In contrast to static charts, the present invention generates a hierarchical data model that is continuously synchronized with structured data repositories such as HR systems, ERP platforms, and allocation databases. Changes to the organizational structure—whether triggered by external systems or internal user actions—are detected and incorporated in near real time. These updates are rendered immediately in an interactive user interface, allowing users to view the live structure of the enterprise with minimal latency and maximum fidelity.

Critically, the system integrates a rule evaluation engine that applies compliance policies at both the individual and aggregate levels. This engine validates employee assignments, reporting lines, platform structures, and team configurations against configurable rules designed to enforce business policies, regulatory requirements, or governance protocols. Rule violations are identified immediately, annotated within the visualization layer, and routed to structured resolution workflows. This capability provides a substantial improvement over prior systems, which typically rely on post-hoc auditing or disconnected validation spreadsheets to identify structural issues.

The system further introduces an attestation manager that enables formal confirmation of role assignments, reporting chains, and team affiliations by designated reviewers such as HR managers, platform leads, or practice owners. Attestations are tracked, logged, and integrated into workflow gating, ensuring that changes are not promoted to production status unless reviewed and approved. This mechanism supports traceability, accountability, and compliance in ways that manual processes cannot replicate, particularly in enterprises with strict audit or change control requirements.

Another technical improvement provided by the disclosed invention is its support for simulation through a sandbox environment. This allows users to preview proposed changes, evaluate structural impact, validate configurations, and stage updates for approval without affecting production data. Changes made in the sandbox may be subject to the same validation and attestation rules as live data, enabling scenario-based allocation while preserving governance safeguards. This simulation capability replaces risky offline allocation practices and empowers organizations to model transitions with confidence and accountability.

These improvements are not limited to user experience enhancements but provide measurable technical benefits. The system reduces data entry duplication, prevents invalid structures from being committed, improves consistency between source systems, and ensures that the displayed organizational structure reflects validated, approved, and compliant assignments. Moreover, it allows multiple stakeholders to collaborate in real time with full awareness of the allocation state, exception backlog, and attestation history.

Taken together, these enhancements constitute a technical improvement in how organizational hierarchy data is collected, processed, validated, and displayed. The system transforms a previously fragmented and reactive allocation process into a centralized, real-time, and auditable workflow. By tightly integrating data ingestion, hierarchy construction, rule enforcement, attestation, and user interaction, the disclosed invention provides a reliable and extensible platform for managing complex organizational structures in modern enterprises.

Figure 3:
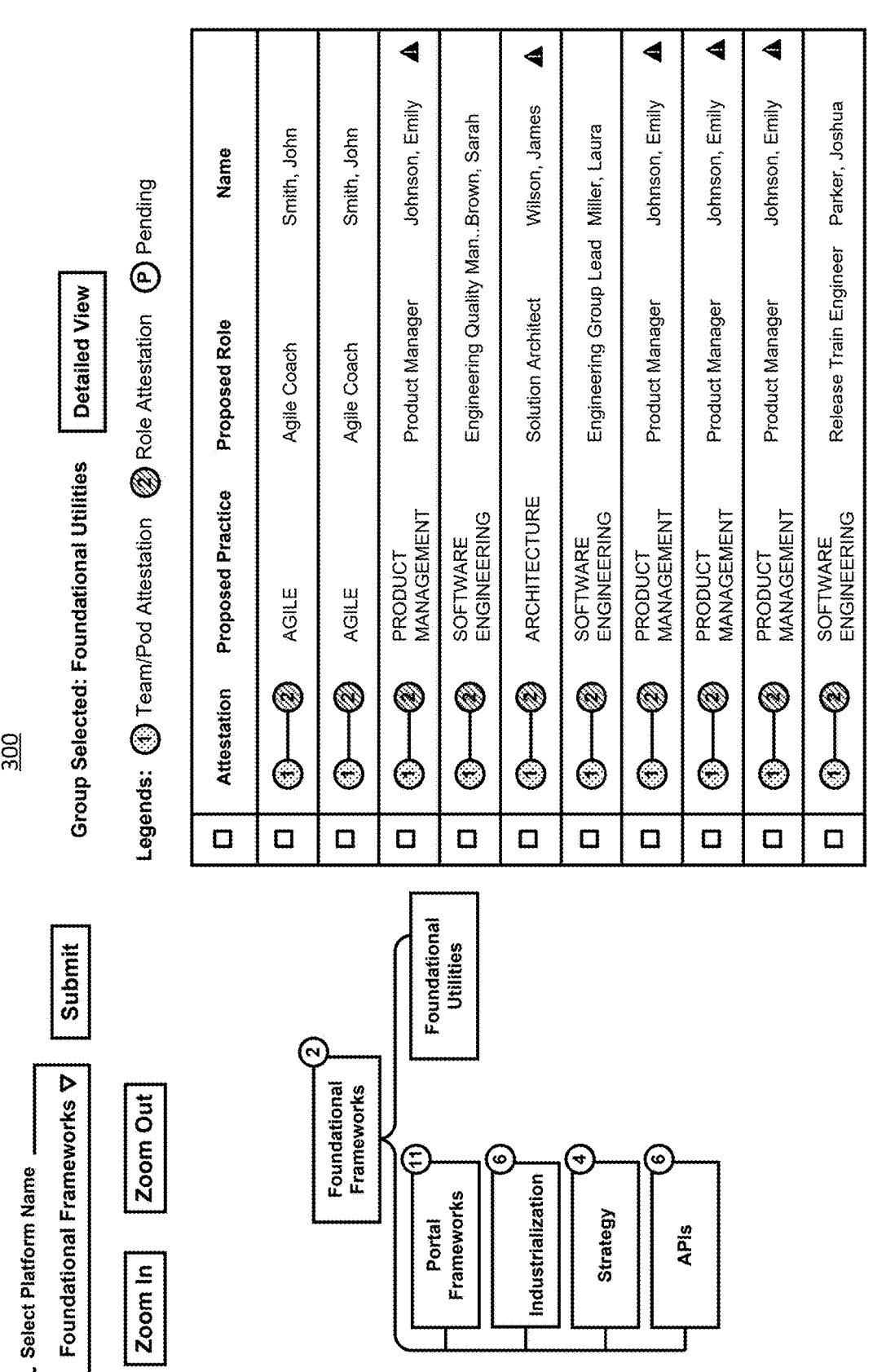
FIG. 3 illustrates an exemplary graphical user interface for displaying a dynamic organizational hierarchy, in accordance with various embodiments.

FIG. 3 illustrates an exemplary graphical user interface for displaying a dynamic organizational hierarchy, in accordance with various embodiments. The interface presents a real-time, interactive visualization of organizational entities such as employees, teams, pods, or platforms, and their corresponding reporting relationships. Nodes within the hierarchy may be displayed with visual attributes including role designation, platform affiliation, and attestation status. In some embodiments, graphical indicators such as icons, highlights, or tooltips may be associated with specific nodes to reflect rule violations or pending attestations. The interface may also include interactive elements that allow users to filter the displayed hierarchy, search for specific individuals or teams, initiate structural changes, or review and confirm attestation workflows.

Figure 4:
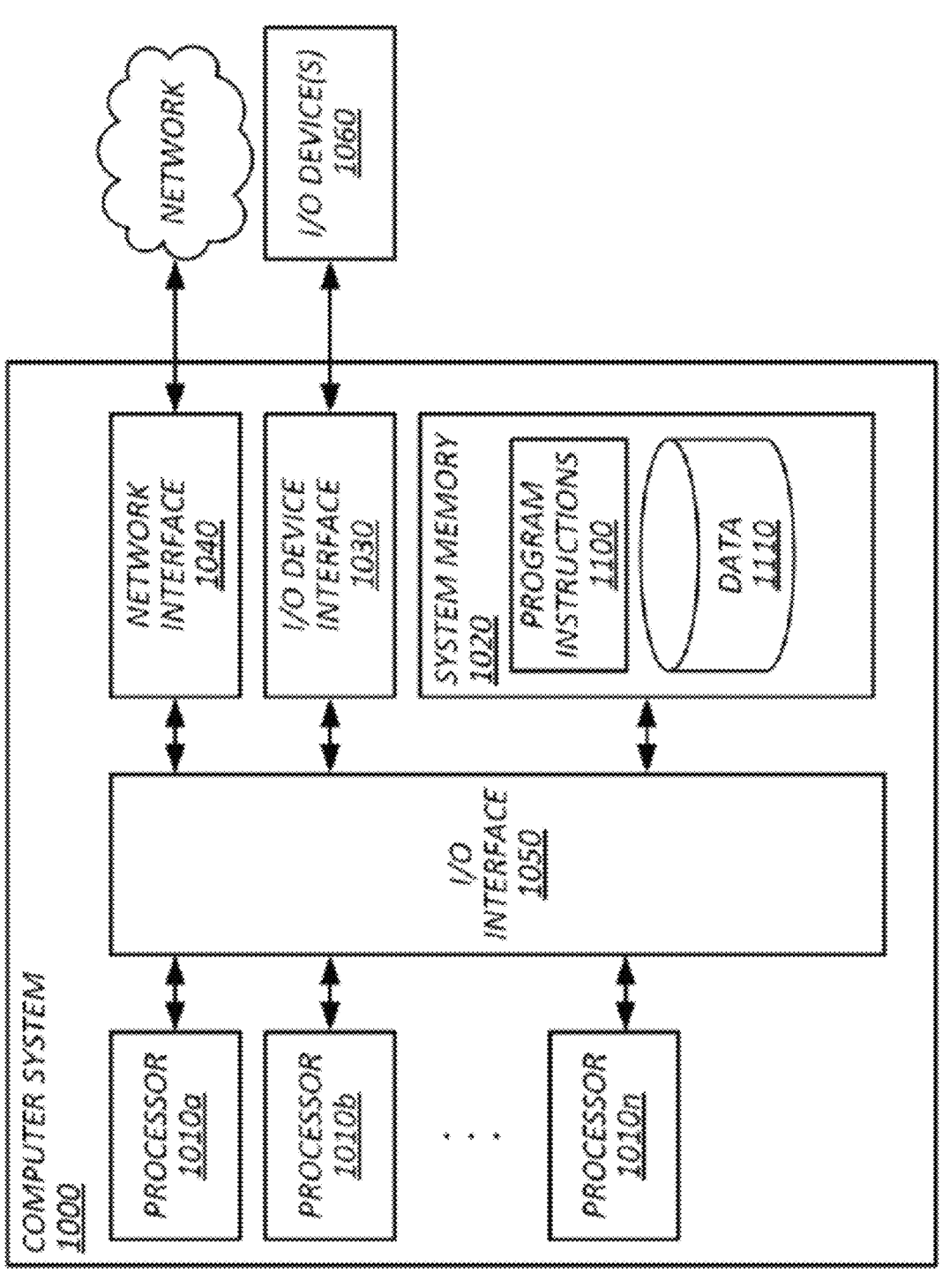
FIG. 4 depicts an example computer system on which systems and methods described herein may be executed, in accordance with at least one embodiment.

Some embodiments may execute the above operations on a computer system, such as the computer system of FIG. 4, which is a diagram that illustrates a computing system 1000 in accordance with embodiments of the present techniques. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010*a*-1010*n*) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010*a*), or a multi-processor system including any number of suitable processors (e.g., 1010*a*-1010*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus may also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, external (e.g., third party) content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B may include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and may be implemented in the form of data that causes functionality to be invoked, e.g., in the form of arguments of a function or API call. To the extent bespoke noun phrases are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

While the systems and methods described herein have generally be described with respect to a single legacy language being translated to a modernized coding language (e.g., one-to-one translation of a first language to a second language), in various embodiments, the same processes may be implemented in a one-to-many framework. For example, in some embodiments, a user may indicate one or more second languages to which a first language is to be translated. Additionally or alternatively, in some embodiments, one or more translation recommendations may be provided (as described herein) for multiple translations. In either event, embodiments of the systems and methods described herein may be configured to process multiple translations, e.g., in parallel and/or in series (e.g., based on an identified priority), as described herein.

This written description uses examples to disclose the implementations, including the best mode, and to enable any person skilled in the art to practice the implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for constructing and updating a dynamic organizational hierarchy visualization, comprising:

retrieving, by a processor, organizational data from one or more structured data repositories, the organizational data comprising one or more of employee identifiers, reporting relationships, role designations, team affiliations, platform assignments, or attestation statuses;

generating, by the processor, a hierarchical data structure representing organizational entities as nodes and reporting relationships as edges, based on the organizational data;

rendering, by the processor, a user interface comprising a visual representation of the hierarchical data structure;

detecting, by the processor, one or more data-change events in the organizational data received from the one or more structured repositories, and dynamically updating the hierarchical data structure and visual representation in real time or near real time via an event-driven synchronization engine in response to the detected one or more data-change events;

applying, by the processor, a set of compliance rules stored within a rule-evaluation engine to the hierarchical data structure to identify rule violations;

identifying, by the processor, one or more nodes associated with data points that have pending or missing attestations;

associating, by the processor, each identified node with attestation metadata recorded in an attestation tracking module and initiating a corresponding structured approval workflow comprising timestamped audit entries;

associating, by the processor, one or more graphical indicators with nodes corresponding to rule violations or pending attestations; and enabling, by the processor, user interaction with the user interface to review, approve, or modify the organizational hierarchy and related data, comprising execution of attestation actions within a sandbox simulation environment separate from production data.

2. The method of claim 1, further comprising determining, by the processor, expected roles for one or more employees based on one or more predefined organizational models.

3. The method of claim 1, further comprising determining, by the processor, reporting line managers for one or more employees based on the employees' assigned roles and existing reporting hierarchies.

4. The method of claim 1, wherein enabling user interaction comprises receiving a search query comprising multiple organizational attributes, and filtering the visual representation to display a subset of nodes matching the search query.

5. The method of claim 1, wherein the graphical indicators comprise visual elements selected from icons, highlights, or tooltips displayed proximate to the nodes corresponding to the rule violations or pending attestations.

6. The method of claim 1, further comprising applying, by the processor, the set of compliance rules stored within the rule-evaluation engine at one or more of an individual employee level or an aggregated platform level.

7. The method of claim 1, further comprising generating, by the processor, a summary of headcount and compensation data grouped by business unit or resource type, and displaying and dynamically updating the summary in response to the detected data-change events in association with the visual representation.

8. The method of claim 1, wherein the sandbox simulation environment enables previewing, validating, and attesting to one or more proposed structural changes prior to synchronization with production data, and further comprising receiving user input approving or rejecting the one or more proposed structural changes for incorporation into the one or more structured data repositories.

9. A system for constructing and updating a dynamic organizational hierarchy visualization, comprising:

at least one processor; and one or more storage devices storing one or more code sets that, when executed by the at least one processor, cause the processor to:

retrieve organizational data from one or more structured data repositories, the organizational data comprising one or more of employee identifiers, reporting relationships, role designations, team affiliations, platform assignments, or attestation statuses, via a data ingestion module;

generate a hierarchical data structure representing organizational entities as nodes and reporting relationships as edges, based on the organizational data, via a hierarchy construction module;

render a user interface comprising a visual representation of the hierarchical data structure, via a graphical rendering module;

detect one or more data-change events in the organizational data received from the one or more structured repositories, and dynamically update the hierarchical data structure and visual representation in real time or near real time in response to the detected one or more data-change events, via an event-driven synchronization module;

apply a set of compliance rules to the hierarchical data structure to identify rule violations, via a rule evaluation module;

identify one or more nodes associated with data points that have pending or missing attestations, via an attestation tracking module;

associate each identified node with attestation metadata recorded in the attestation tracking module and initiate a corresponding structured approval workflow comprising timestamped audit entries;

associate one or more graphical indicators with nodes corresponding to rule violations or pending attestations, via the graphical rendering module; and enable user interaction with the user interface to review, approve, or modify the organizational hierarchy and related data, comprising execution of attestation actions within a sandbox simulation environment separate from production data, via the graphical rendering module.

10. The system of claim 9, further configured to determine expected roles for one or more employees based on one or more predefined organizational models.

11. The system of claim 9, further configured to determine reporting line managers for one or more employees based on the employees' assigned roles and existing reporting hierarchies.

12. The system of claim 9, wherein enabling user interaction comprises receiving a search query comprising multiple organizational attributes, and filtering the visual representation to display a subset of nodes matching the search query.

13. The system of claim 9, wherein the graphical indicators comprise visual elements selected from icons, highlights, or tooltips displayed proximate to the nodes corresponding to the rule violations or pending attestations.

14. The system of claim 9, further comprising applying, by the processor, the set of compliance rules at one or more of an individual employee level or an aggregated platform level.

15. The system of claim 9, further configured to generate a summary of headcount and compensation data grouped by business unit or resource type, and display and dynamically update the summary in response to the detected data-change events in association with the visual representation.

16. The system of claim 9, wherein the sandbox simulation environment enables previewing, validating, and attesting to one or more proposes structural changes prior to synchronization with production data, and is further configured to receive user input approving or rejecting the one or more proposed structural changes for incorporation into the one or more structured data repositories.

17. A non-transitory computer-readable medium storing instructions that, when executed by one or more processors, cause the one or more processors to:

retrieve organizational data from one or more structured data repositories, the organizational data comprising one or more of employee identifiers, reporting relationships, role designations, team affiliations, platform assignments, or attestation statuses;

generate a hierarchical data structure representing organizational entities as nodes and reporting relationships as edges, based on the organizational data; render a user interface comprising a visual representation of the hierarchical data structure;

detect one or more data-change events in the organizational data received from the one or more structured repositories, and dynamically update the hierarchical data structure and visual representation in real time or near real time via an event-driven synchronization engine in response to the detected one or more data-change events;

apply a set of compliance rules stored within a rule-evaluation engine to the hierarchical data structure to identify rule violations;

identify one or more nodes associated with data points that have pending or missing attestations;

associate each identified node with attestation metadata recorded in an attestation tracking module and initiating a corresponding structured approval workflow comprising timestamped audit entries;

associate one or more graphical indicators with nodes corresponding to rule violations or pending attestations; and enable user interaction with the user interface to review, approve, or modify the organizational hierarchy and related data, comprising execution of attestation actions within a sandbox simulation environment separate from production data.

18. The non-transitory computer-readable medium of claim 17, wherein the graphical indicators comprise visual elements selected from icons, highlights, or tooltips displayed proximate to the nodes corresponding to the rule violations or pending attestations.

19. The non-transitory computer-readable medium of claim 17, further configured to apply the set of compliance rules stored within the rele-evaluation engine at one or more of an individual employee level or an aggregated platform level.

20. The non-transitory computer-readable medium of claim 17, wherein the sandbox simulation environment enables previewing, validating, and attesting to one or more proposes structural changes prior to synchronization with production data, and is further configured to receive user input approving or rejecting the one or more proposed structural changes for incorporation into the one or more structured data repositories.

\* \* \* \* \*